United States Patent [19]

Omata

[11] Patent Number: 4,513,473
[45] Date of Patent: Apr. 30, 1985

[54] SEALED ROTARY MOTION DAMPER

[75] Inventor: Nobuaki Omata, Yokohama, Japan

[73] Assignee: Nifco Inc., Yokohama, Japan

[21] Appl. No.: 562,061

[22] Filed: Dec. 16, 1983

[30] Foreign Application Priority Data

Dec. 23, 1982 [JP] Japan .................. 57-193979[U]

[51] Int. Cl.³ .................................................. E05F 5/02
[52] U.S. Cl. ...................................... 16/82; 188/290; 277/84
[58] Field of Search .................. 16/51, 54, 55, 82, 84, 16/DIG. 9; 188/290; 277/82, 84

[56] References Cited

U.S. PATENT DOCUMENTS 4,342,135  8/1982  Matsuo et al. ........................ 16/82
4,426,752  1/1984  Nakayama ...................... 188/290 X
4,468,836  9/1984  Omata .................................. 16/82

FOREIGN PATENT DOCUMENTS 1531683  5/1980  France .................................. 277/82

Primary Examiner—Fred A. Silverberg
Attorney, Agent, or Firm—J. R. Halvorsen; T. W. Buckman

[57] ABSTRACT

An oil type damper comprises a rotor provided with a toothed wheel and a boss, a base seat provided with a tubular part adapted to be fitted to the boss of the rotor and a shaft adapted to be inserted into the interior of the rotor, and an oil sealer element adapted to be set in position in the interior of the rotor in an unrotatable state relative to the shaft of the base seat. The open edge of the sealer element is folded back and held in fast contact with the inner surface of the boss of the rotor to provide prevention of leakage of the oil interposed between the rotor and the sealer element even when the oil is thermally expanded.

4 Claims, 5 Drawing Figures

SEALED ROTARY MOTION DAMPER

BACKGROUND OF THE INVENTION

This invention relates to an oil type damper for damping opening and closing motions of lids and drawers in various devices. More particularly, this invention relates to improvements in and concerning oil dampers of simple construction for effectively damping and moderating opening and closing motions of lids or the like by utilizing the resistance offered by the viscosity of an oil such as silicone grease.

In cassette tape recorders and video tape recorders, for example, are used dampers which are adapted to damp and moderate the opening and closing motions of audio and video tape holders. These dampers protect the recorders from vibrations and impacts that would otherwise be caused by the forceful opening and closing motions of their tape holders and thus help to keep the recorders in good operating condition. The dampers having this function broadly fall into two types; the friction type (disclosed in Japanese Utility Model Application Disclosure No. Sho 55(1980)-75805, for example) and the oil type using viscous oil (disclosed in U.S. Pat. No. 4,342,135 and Japanese Utility Model Application Disclosure No. Sho 57(1982)-8604, for example).

The dampers of the former friction type cannot be expected to provide smooth opening and closing motions. Worse still, they suffer gradual degradation of their performance by aging.

Now, the basic construction of a conventional damper of the latter type will be described with reference to FIGS. 1 and 2. This conventional damper comprises two parts of a rotor a and a base seat b. The rotor a is composed of a toothed wheel 1 for receiving a rotational input from an external source, a boss 2 formed integrally and concentrically with the toothed wheel 1, a hollow part 3 formed continuously in the toothed wheel 1 and the boss 2. The base seat b comprises a base 4 adapted to be attached to a given device, a tubular part 5 fastened to the base 4 and adapted to be fitted around the boss 2, and a shaft 6 formed concentrically with the tubular part 5, fastened similarly to the base 4 and adapted to be inserted into the hollow part 3. The oil type damper which is assembled by applying oil such as silicone grease to the inner and outer peripheral surfaces of the boss 2 and/or to the inner peripheral surface of the tubular part 5 and the outer surface of the shaft 6, inserting the shaft 6 into the hollow part 3 of the boss 2 and, at the same time, fitting the boss 2 to the inner surface of the tubular part 5 has been known to the art. This damper is designed to operate by having the rotor a fitted to the base seat b and is not provided with any means capable of preventing leakage of silicone grease from the frictional surfaces. During the summer, for example, the oil is thermally expanded and forced out of the interior of the damper and, as a result, the damper fails to provide its prescribed effect of damping and moderating the rotational motions in the device in which the damper is used. To preclude this trouble, there may be conceived the idea of sealing the interface between the tubular part 5 and the boss 2 with an O-ring thereby preventing otherwise possible leakage of the oil. In this case, the O-ring must be forcibly set in position in the interface between the tubular part 5 and the boss 2. The friction consequently generated between these two parts surpasses the resistance offered by the viscosity of the oil to a point where the damper will fail to damp or moderate the frictional motions as smoothly as required.

One device developed for the purpose of preventing the oil applied inside the damper from being thermally expanded, for example, and consequently forced out of the housing of the damper consists in partitioning the interior of the housing with a flexible membrane, filling one side of the membrane and leaving the other side of the membrane empty. This device permits perfect prevention of the leakage of the oil because the flexible membrane is capable of absorbing any expansion of the oil caused by heat or some other agency. It nevertheless suffers from inevitable complication of construction.

SUMMARY OF THE INVENTION

An object of this invention is to provide an oil type damper simple in construction and excellent in durability and capable of safely and smoothly damping and moderating opening and closing motions of lids or drawers in various devices and preventing the oil used therein from leaking out of the housing even when the oil is expanded because of change in environmental temperature, for example.

To accomplish the object described above according to the present invention, there is provided an oil type damper which comprises a rotor consisting of a toothed wheel and a boss and containing a hollow part therein, a base seat possessing a tubular part adapted to be fitted around the outer surface of the boss of the rotor and a shaft adapted to be fitted into the hollow part of the rotor, and an oil sealer element inserted into the hollow part of the rotor in an unrotatable state relative to the shaft of the base seat.

This oil type damper is able to provide perfect prevention of leakage of the damper oil due to thermal expansion thereof by providing the shaft of the base seat for insertion into the rotor with a proper detent, covering the shaft with the sealer element of the shape of a tube, covering the sealer element with the rotor and bringing the annular flange formed at the open edge of the sealer element into contact with the inner surface of the rotor thereby sealing the interior of the rotor, and precluding otherwise possible leakage of the damper oil out of the interface between the inner surface of the rotor and the outer surface of the sealer element by virtue of the annular flange of the sealer element.

The other objects and characteristic features of this invention will become apparent to those skilled in the art as the further disclosure is made in the following detailed description of the invention with reference to the accompanying drawings.

DESCRIPTION OF THE PREFERRED EMBODIMENT

Figure 1:
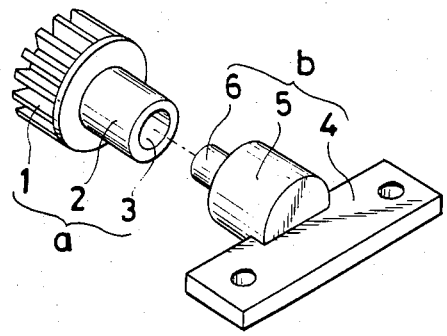
FIG. 1 is a perspective view of a conventional oil type damper in a disassembled state.
Figure 2:
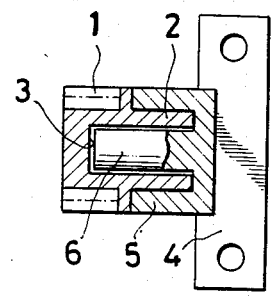
FIG. 2 is a cross section of the oil type damper in an assembled state.
Figure 3:
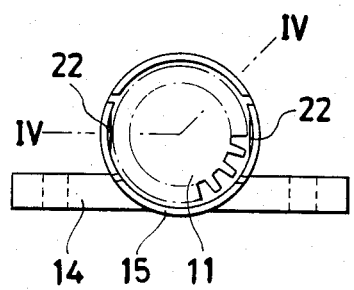
FIG. 3 is a plan view of a typical oil type damper of this invention.

This invention relates to an oil type damper capable of preventing the oil contained therein from leaking out when it is thermally expanded. The construction of this oil type damper will be described below with reference to FIGS. 3-5. A rotor A comprises a toothed wheel 11 and a boss 12 integrally formed therewith. A hollow part 13 of the rotor A is defined by a small-diameter part 13a formed inside the toothed wheel 11 and a large-diameter part 13b formed inside the boss 12.

A base seat B comprises a base 14 provided with fitting holes, for example, to be used for attachment to a given device, a tubular part 15 adapted to be fitted around the outer surface of the boss 12, and a shaft 16 adapted to be inserted into the hollow part 13 of the rotor A. Since the shaft is designed to be inserted into the hollow part 13 of the rotor A as covered with a sealer element 17 of the shape of a tube, it has an outside diameter and a length smaller than the inside diameter and the length of the small-diameter part 13a.

The rotor A and the base seat B are separately molded of a suitable plastic material and the sealer element 17 is similarly molded of a suitable plastic material.

The sealer element 17 is provided on the inner surface thereof with projections 18 serving to lock the sealer element 17 relative to the base seat B. The base seat B is provided on the outer end of the shaft 17 with recesses 19 for admitting the aforementioned projections 18. In the present embodiment, since the projections 18 are formed continuously on the inner surface of a top wall 17a of the sealer element 17 and the inner surface of a peripheral wall 17b, the recesses 19 are correspondingly formed on the outer surface of the upper edge of the shaft 16 and on the outer peripheral surface of a radially enlarged part 16a formed in the lower portion of the periphery of the shaft 16. Here, two projections are formed at angular intervals of 180° and four recesses at angular intervals of 90°. Optionally, there may be used one projection and one recess. The number of projections and recesses can be selected freely. The projections are not always required to be formed continuously on the top wall and the peripheral wall 17b. Projections formed only on either of the two walls will function satisfactorily. When they are formed on either of the two walls, the recesses may be formed only on the outer surface of the upper edge or on the outer peripheral surfaces as matched to the projections.

Figure 4:
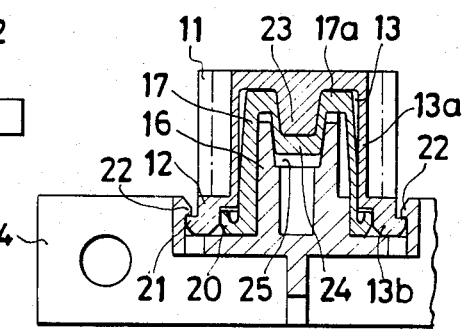
FIG. 4 is an enlarged cross section of the oil type damper of FIG. 3.
Figure 5:
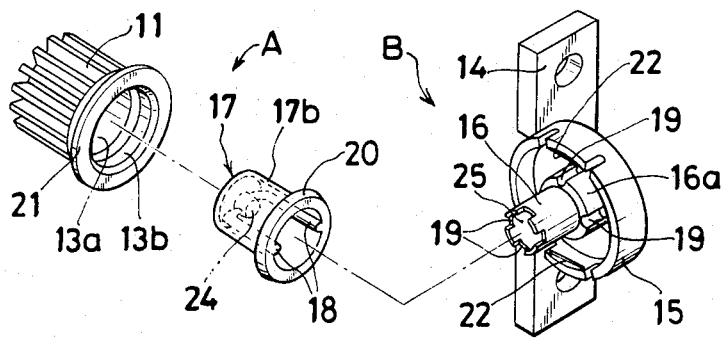
FIG. 5 is a perspective view of a base seat and a sealer element in a separated state.

The sealer element 17 is provided at the open edge thereof with a radially protruding annular flange 20 adapted to come into tight contact with the inner surface of the hollow part of the rotor A near the open edge thereof, specifically in the present embodiment, the inner surface of the large-diameter part 13b, so as to seal the interior of the hollow part. This annular flange 20 is desired to be formed in a shape folded back as illustrated in FIG. 4.

Assemblage of the oil type damper constructed as described above is effected by slipping the sealer element 17 over the shaft 16 with the projections 18 matched to the recesses 19, applying oil to either or both of the outer surface of the sealer element and the inner surface of the small-diameter part of the hollow part of the rotor A, and then covering the sealer element with the rotor A, or filling the interior of the small-diameter part of the rotor A with the oil in advance and then fitting the sealer element into the small-diameter part. In this arrangement, the sealer element 17 is not sympathetically rotated with the rotor A and the film of oil interposed therebetween is not sympathetically rotated with the rotor A. The oil thus intervening between the sealer element and the rotor, therefore, serves to damp or moderate any rotational motion imparted to the rotor A. The annular flange 20 remains in contact with the inner surface of the large-diameter part of the hollow part in the rotor A and serves to hold back the oil and prevent it from leaking out when the oil is thermally expanded. The effect of the damper which is manifested in damping or moderating the motion imparted to the rotor by some rotational input from an external source, therefore, is retained intact in spite of elapse of time.

In this case, when the annular flange is formed in the shape folded back as illustrated in the drawing, the oil thermally expanded and consequently urged outwardly exerts its pressure upon the inside of the folded part of the flange and presses the outer surface of the flange more strongly against the inner surface of the large-diameter part 13b. Thus, the oil is completely prevented from leaking out.

The radially enlarged part 16a formed at the base of the shaft for permitting formation therein of those recesses serving to admit the projections in the sealer element may be given a suitably selected outside diameter such that the outer surface thereof, when fitted into the inner wall of the open part of the sealer element, will coaxially position the sealer element and the base seat. Further, the rotor A may be provided at the center of the inner surface of the top wall thereof with a shaft-like projection 23 and the sealer element may be correspondingly provided at the center of the upper surface thereof with a recess 24 having a bottom downwardly pushed out so as to admit the projection 23 and the shaft 16 may be provided at the center of the upper surface thereof with a hole 25 for admitting the aforementioned protruding bottom of recess 24. Consequently, the hole 25 accommodates the recess 24 which in turn has admitted the shaft-like projection 23, to determine coaxially the positions of the rotor, the base seat, and the sealer element. Once their positions are coaxially determined as described above, the rotor A can be prevented from oscillating around the shaft having an outside diameter smaller than the inside diameter of the hollow part 13.

The boss of the rotor A may be provided at the edge thereof with an outwardly protruding engaging flange 21 and the tubular part 15 adapted to be fitted on the outer surface of this flange 21 may be provided with several spaced check claws 22. When the rotor A is pushed into the tubular part 15 while the rotor A is slipped on the sealer element, the check claws 22 snap into engagement with the upper surface of the flange 21 to join the rotor A and the base seat B inseparably.

Optionally, the projections and the recesses jointly serving to lock the seal element relative to the base seat may be formed respectively on the base seat and the seal element. Such change of the positions of the projections and the recesses does not affect the function they fulfil.

What is claimed is:

1. An oil type damper, comprising a rotor formed of a toothed wheel and a boss and provided with a hollow part coaxially formed in said toothed wheel and boss and opening at the end of said boss, a base seat incorporating a base for attachment to a given device and provided with a tubular part adapted to be fitted around the outer surface of said boss of said rotor and a shaft formed coaxially with respect to said tubular part and adapted to be inserted into said hollow part of said rotor, said tubular part and said shaft both being formed on said base, and a separate sealer element having the shape of a tube and having a closed end and an open end and being inserted into said hollow part of the rotor so as to define a space between the sealer element and said rotor wherein oil is contained in said space and said sealer element is provided at the open end with an annular flange that is in sealing contact with an inner surface of the open end of said hollow part of said rotor, one of said shaft of the base seat and said sealer element being provided with at least one recess and the other being provided with at least one projection to be matched to said recess so as to prevent rotation of said shaft of the base seat and said sealer element.

2. A damper according to claim 1, wherein said annular flange formed at the open end of said sealer element is formed in a folded-back shape.

3. A damper according to claim 1, wherein said rotor is provided at the center of the inner surface of the top wall thereof with a shaft-like projection and said sealer element is provided at the center of the upper surface thereof with a recess for admitting said shaft-like projection.

4. A damper according to claim 1, wherein said boss of said rotor is provided along the outer periphery of the edge thereof with an engaging flange and said tubular part of said base seat is provided along the inner surface thereof with check claws adapted to be engaged with said engaging flange.

* * * * *